(12) United States Patent
Worsley et al.

(10) Patent No.: US 8,664,143 B2
(45) Date of Patent: Mar. 4, 2014

(54) HIGH SURFACE AREA, ELECTRICALLY CONDUCTIVE NANOCARBON-SUPPORTED METAL OXIDE

(75) Inventors: Marcus A. Worsley, Hayward, CA (US); Thomas Yong-Jin Han, Livermore, CA (US); Joshua D. Kuntz, Livermore, CA (US); Octavio Cervantes, Tracy, CA (US); Alexander E. Gash, Brentwood, CA (US); Theodore F. Baumann, Discovery Bay, CA (US); Joe H. Satcher, Jr., Patterson, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 83 days.

(21) Appl. No.: 13/281,185

(22) Filed: Oct. 25, 2011

(65) Prior Publication Data

US 2012/0122652 A1    May 17, 2012

Related U.S. Application Data

(63) Continuation of application No. 12/694,425, filed on Jan. 27, 2010, now abandoned, which is a continuation-in-part of application No. 12/652,616, filed on Jan. 5, 2010.

(60) Provisional application No. 61/147,805, filed on Jan. 28, 2009, provisional application No. 61/147,694, filed on Jan. 27, 2009.

(51) Int. Cl.
| | | |
|---|---|---|
| *B01J 13/00* | (2006.01) | |
| *B01J 21/18* | (2006.01) | |
| *B01J 23/00* | (2006.01) | |
| *B01J 23/02* | (2006.01) | |
| *B01J 23/06* | (2006.01) | |
| *B01J 23/40* | (2006.01) | |
| *B01J 23/74* | (2006.01) | |
| *B01F 3/08* | (2006.01) | |
| *C08J 3/02* | (2006.01) | |
| *C08L 91/08* | (2006.01) | |
| *C08L 95/00* | (2006.01) | |
| *C09D 195/00* | (2006.01) | |
| *C09K 3/00* | (2006.01) | |
| *B01D 21/01* | (2006.01) | |

(52) U.S. Cl.
USPC ........... 502/183; 502/180; 502/182; 502/184; 502/185; 516/38; 516/88; 516/90; 516/95; 516/99

(58) Field of Classification Search
USPC .......... 502/180, 182–185; 516/38, 88, 90, 95, 516/99
See application file for complete search history.

(56) References Cited

U.S. PATENT DOCUMENTS

| | | |
|---|---|---|
| 5,260,855 A | 11/1993 | Kaschmitter et al. |
| 5,409,683 A | 4/1995 | Tillotson et al. |

(Continued)

FOREIGN PATENT DOCUMENTS

WO    WO 2008/000163 A1    1/2008

OTHER PUBLICATIONS

"Carbon Nanotube Aerogels," Mateusz B. Bryning et al. Advanced Materials (2007), 19, pp. 661-664.*

(Continued)

*Primary Examiner* — Patricia L Hailey
(74) *Attorney, Agent, or Firm* — Foley & Lardner, LLP

(57) ABSTRACT

A metal oxide-carbon composite includes a carbon aerogel with an oxide overcoat. The metal oxide-carbon composite is made by providing a carbon aerogel, immersing the carbon aerogel in a metal oxide sol under a vacuum, raising the carbon aerogel with the metal oxide sol to atmospheric pressure, curing the carbon aerogel with the metal oxide sol at room temperature, and drying the carbon aerogel with the metal oxide sol to produce the metal oxide-carbon composite. The step of providing a carbon aerogel can provide an activated carbon aerogel or provide a carbon aerogel with carbon nanotubes that make the carbon aerogel mechanically robust.

19 Claims, 10 Drawing Sheets

(56) References Cited

U.S. PATENT DOCUMENTS

| | | | |
|---|---|---|---|
| 5,601,938 | A | 2/1997 | Mayer et al. |
| 6,500,401 | B2 | 12/2002 | Reznek et al. |
| 6,653,356 | B2 | 11/2003 | Sherman |
| 6,809,060 | B2 * | 10/2004 | Suh et al. .................. 502/185 |
| 6,843,919 | B2 | 1/2005 | Klabunde et al. |
| 6,906,003 | B2 | 6/2005 | Struthers et al. |
| 6,986,818 | B2 | 1/2006 | Tillotson et al. |
| 7,005,401 | B2 | 2/2006 | Lu et al. |
| 7,074,880 | B2 | 7/2006 | Rhine et al. |
| 7,256,147 | B2 | 8/2007 | Yamada et al. |
| 7,270,851 | B2 | 9/2007 | Sullivan |
| 7,282,466 | B2 | 10/2007 | Long et al. |
| 7,378,450 | B2 | 5/2008 | Erkey et al. |
| 7,410,718 | B2 | 8/2008 | Cooper et al. |
| 7,442,747 | B1 | 10/2008 | Long et al. |
| 7,780,875 | B2 | 8/2010 | Asgari |
| 8,172,964 | B2 * | 5/2012 | Gash et al. .................. 149/17 |
| 2002/0094426 | A1 | 7/2002 | Stepanian et al. |
| 2004/0176643 | A1 | 9/2004 | Sato et al. |
| 2006/0293434 | A1 | 12/2006 | Yodh et al. |
| 2007/0292732 | A1 | 12/2007 | Feaver et al. |
| 2009/0123358 | A1 | 5/2009 | Costa et al. |
| 2009/0185327 | A1 | 7/2009 | Seymour |
| 2009/0229032 | A1 | 9/2009 | Stepanian et al. |
| 2009/0317619 | A1 | 12/2009 | Di Monte et al. |
| 2010/0028634 | A1 | 2/2010 | Turevskaya et al. |
| 2010/0139823 | A1 | 6/2010 | Gash et al. |

OTHER PUBLICATIONS

"Group 6 metal oxide-carbon aerogels. Their Synthesis, characterization and catalytic activity in the skeletal isomeriation of 1-butene", Carlos Moreno-Castilla et al. Applied Catalysis A: General 183 (1999), pp. 345-356.*

"Fast hydrogen generation from NaBH4 hydrolysis catalyzed by carbon aerogels supported cobalt nanoparticles," Jie Zhu et al. International Journal of Hydrogen Energy (2013), pp. 1-7.*

U.S. Appl. No. 13/051,915, filed Mar. 18, 2011, Worsley et al.
U.S. Appl. No. 61/147,805, filed Jan. 28, 2009, Worsley et al.
U.S. Appl. No. 12/652,616, filed Jan. 5, 2010, Worsley et al.
U.S. Appl. No. 12/761,157, filed Apr. 15, 2010, Worsley et al.
U.S. Appl. No. 13/281,160, filed Oct. 25, 2011, Worsley et al.
Poole, C.P., Jr. et al. "Carbon Nanostructures", in *Introduction to Nanotechnology*. John Wiley & Sons, 2003, pp. 103-132.

Worsley, M. et al. "Synthesis and Characterization of Nanocarbon-Supported Titanium Dioxide". Mater. Res. Soc. Proc. vol. 1174, 2009.

Worsley, M. et al. "High Surface Area Carbon Nanotube-Supported Titanium Carbonitride Aerogels". J. Mater. Chem., 19, 2009, pp. 5503-5506.

Worsley, M. et al. "Route to High Surface Area TiO2/C and TiCN/C Composites". J. Mater. Chem., 19, 2009, pp. 7146-7150.

Pekala, R.W. et al. "Carbon Aerogels for Electrochemical Applications". Journal of Non-Crystalline Solids, 225, 1998, pp. 74-80.

Maldonado-Hodar, F.J. et al. "Metal-Carbon Aerogels as Catalysts and Catalyst Supports". Studies in Surface Science and Catalysis, 130, 2000, pp. 1007-1012.

Hwang, S.W. et al. "Synthesis and Characterization of Tin Oxide/Carbon Aerogel Composite Electrodes for Electrochemical Supercapacitors". Journal of Power Sources, 172, 2007, pp. 451-459.

Petricevic, R. et al. "Planar Fibre Reinforced Carbon Aerogels for Application in PEM Fuel Cells". Carbon, 39, 2001, pp. 857-867.

Bordjiba, T. "New Class of Carbon-Nanotube Aerogel Electrodes for Electrochemical Power Sources". Advanced Materials, 20, 2008, pp. 815-819.

Worsley, M. et al. "Mechanically robust and electrically conductive carbon nanotube foams". Applied Physics Letters, 94, 2009, 073115.

Kucheyev, S.O. "Depth-Sensing Indentation of Low-Density Brittle Naoporous Solids." Acta Materialia, 57, 2009, pp. 3472-3480.

Bryning, M.B. "Carbon Nanotube Aerogels". Advanced Materials, 19, 2007, pp. 661-664.

Worsley, M. et al. "Stiff and Electrically Conductive Composites of Carbon Nanotube Aerogels and Polymers". J. Mater. Chem., 19, 2009, pp. 3370-3372.

Worsley, M. et al. "Properties of single-walled carbon nanotube-based aerogels as a function of nanotube loading". Acta Materialia, 57, 2009, pp. 5131-5136.

Mateusz B. Bryning, Daniel E. Milkie, Mohammad F. Islam, Lawrence A. Hough, James M. Kikkawa, and Arjun G. Yodh, Carbon Nanotube Aerogels, Adv. Mater. 2007, 19, 661-664, © 2007 Wiley-VCH Verlag GmbH & Co. KGaA, Weinheim.

M. A. Worsley, J. H. Satcher, T. F. Baumann, Synthesis and Characterization of Carbon Aerogel Nanocomposites Containing Double-Walled Carbon Nanotubes, ACS Philadelphia, PA, United States Aug. 17, 2008 through Aug. 21, 2008, LLNL-CONF-402282.

Marcus A. Worsley, Joe H. Satcher, Jr., and Theodore F. Baumann, Synthesis and Characterization of Monolithic Carbon Aerogel Nanocomposites Containing Double-Walled Carbon Nanotubes, Langmuir 2008, 24, 9763-9766, _2008 American Chemical Society.

* cited by examiner

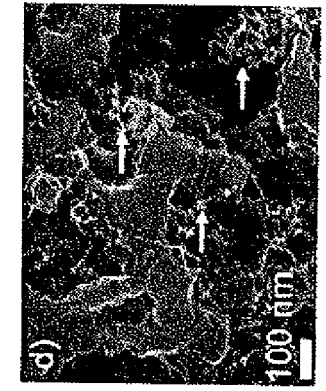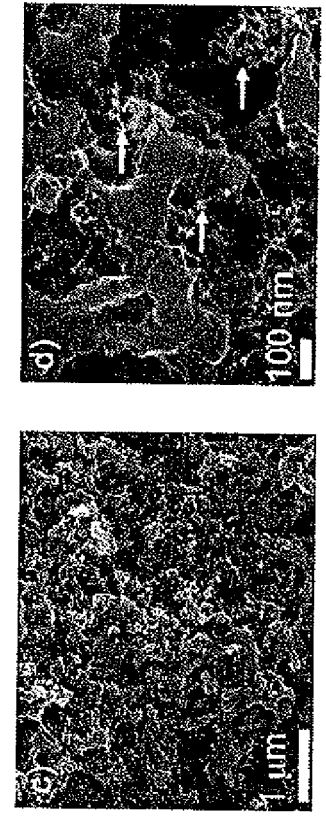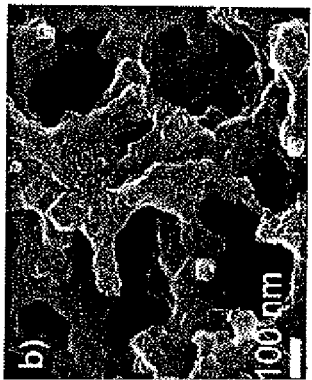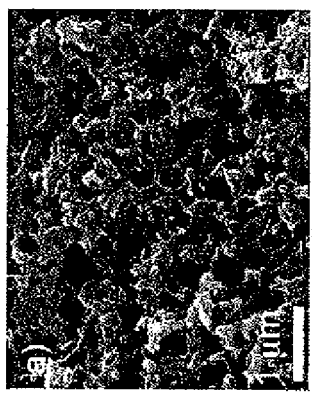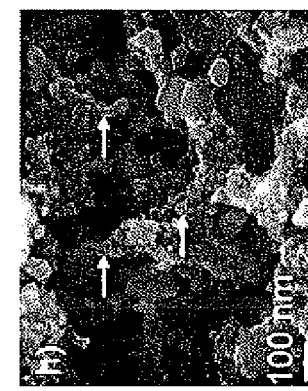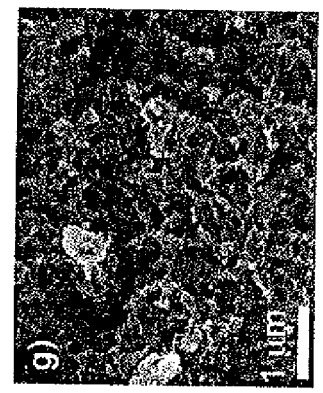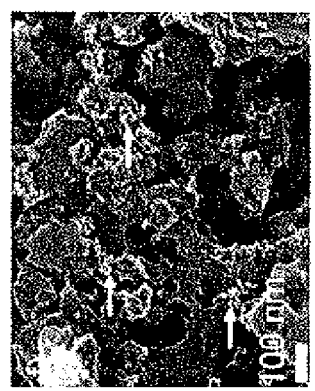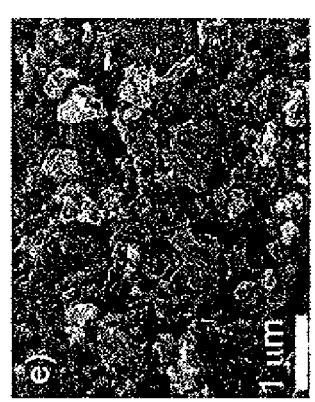

```
┌─────────────────────────────┐
│ IMMERSE IN TiO2 SOL. INFILTRATION │
│ OF PORE NETWORK ACHIEVED    │──909
│ UNDER VACUUM                │
└─────────────┬───────────────┘
              ▼
┌─────────────────────────────┐
│ RETURN TO ATMOSPHERIC PRESSURE │
│ AND DRY WET GEL COMPOSITE   │──910
│ USING SUPERCRITICAL CO2     │
└─────────────────────────────┘
```

FIG. 9B

```
                                  ◄──1000
┌─────────────────────────────┐
│ RESORCINOL AND 37%          │
│ FORMALDEHYDE SOLUTION       │──1001
│ DISSOLVED IN WATER          │
└─────────────┬───────────────┘
              ▼
┌─────────────────────────────┐
│ ADD GLACIAL ACETIC ACID     │──1002
└─────────────┬───────────────┘
              ▼
┌─────────────────────────────┐
│ TRANSFERRED TO GLASS        │
│ MOLDS AND CURED AT          │──1003
│ 80°C FOR 72 HOURS           │
└─────────────┬───────────────┘
              ▼
┌─────────────────────────────┐
│ RESULTANT ORGANIC HYDROGELS │
│ WASHED WITH ACETONE TO      │
│ REMOVE WATER AND DRIED WITH │──1004
│ SUPERCRITICAL CO2           │
└─────────────┬───────────────┘
              ▼
┌─────────────────────────────┐
│ ORGANIC AEROGELS CARBONIZED │
│ AT 1050°C FOR 3 HOURS UNDER │──1005
│ N2 ATMOSPHERE               │
└─────────────────────────────┘
```

FIG. 10A

HIGH SURFACE AREA, ELECTRICALLY CONDUCTIVE NANOCARBON-SUPPORTED METAL OXIDE

CROSS-REFERENCE TO RELATED APPLICATIONS

The present application is a continuation application of U.S. application Ser. No. 12/694,425, filed Jan. 27, 2010, which claims benefit under 35 U.S.C. §119(e) of U.S. Provisional Patent Application No. 61/147,805 filed Jan. 28, 2009 entitled "High Surface Area, Electrically Conductive Nanocarbon-Supported Metal Oxide," the disclosure of which is hereby incorporated by reference in its entirety for all purposes.

The present application is also a continuation-in-part application of U.S. application Ser. No. 12/652,616, filed Jan. 9, 2010, which claims benefit under 35 U.S.C. 119(e) of U.S. Provisional Patent Application No. 61/147,694 filed Jan. 27, 2009 entitled "Mechanically Robust, Electrically Conductive Ultralow-Density Carbon Nanotube-Based Aerogels," the disclosures of which are hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to metal oxide and more particularly to a high surface area, electrically conductive nanocarbon-supported metal oxide.

2. State of Technology

Porous metal oxides can be prepared by a number of techniques ranging from sol-gel synthesis to various templating/support methods. These porous metal oxides have shown enhanced catalytic activity, compared to bulk material, but are still limited by surface areas less than 1000 $m^2/g$. This is even the case when using high surface area templates such as SBA-15 or MCM-41. Surface areas for the templated metal oxides can be less than 200 $m^2/g$. The use of supports, such as carbon nanotubes, also yields surface areas less than 300 $m^2/g$. Another issue presented by many porous metal oxides is that their pore structure collapsing at elevated temperatures. For example in titania aerogels, this lack of pore stability results in order of magnitude decreases in surface area under heating. The presence of silica has been shown to provide some stabilization of pores at high temperatures in titania-silica composites. However, the surface area is still significantly decreased under heating.

Carbon nanotubes (CNTs) possess a number of intrinsic properties that have made them promising materials in the design of composite materials. CNTs can have electrical conductivities' as high as $10^6$ $Sm^{-1}$, thermal conductivities as high as 3000 $Wm^{-1}K^{-1}$, elastic moduli[3] on the order of 1 TPa, and are extremely flexible. Unfortunately, the realization of these properties in macroscopic forms such as foams and composites has been limited. Foams, though conductive, tend to be mechanically weak due to their dependence on van der Waals forces for mechanical integrity.

The treatise, *Introduction to Nanotechnology*, by Charles P. Poole, Jr., and Frank J. Owens. John Wiley &. Sons, 2003, states: "Nanotechnology is based on the recognition that particles less than the size of 100 nanometers (a nanometer is a billionth of a meter) impart to nanostructures built from them new properties and behavior. This happens because particles which are smaller than the characteristic lengths associated with particular phenomena often display new chemistry and physics, leading to new behavior which depends on the size. So, for example, the electronic structure, conductivity, reactivity, melting temperature, and mechanical properties have all been observed to change when particles become smaller than a critical size."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a metal oxide-carbon aerogel composite that includes a carbon aerogel with a metal oxide overcoat. The metal oxide-carbon composite is made by providing a carbon aerogel, immersing the carbon aerogel in a metal oxide sol under a vacuum, returning the carbon aerogel with the metal oxide sol to atmospheric pressure, curing the carbon aerogel with the metal oxide sol at room temperature, and drying the carbon aerogel with the metal oxide sol to produce the metal oxide-carbon composite. The step of providing a carbon aerogel can be providing an activated carbon aerogel or providing a carbon aerogel with carbon nanotubes that make the carbon aerogel mechanically robust.

The invention has use as a commercial catalyst. The invention also has use as an electrode, for example as an electrode for batteries and super capacitors. The invention also has use in water purification, electrical/electrochemical energy storage, solar energy, and hydrogen storage.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 6A-H are SEM images of ACA (a,b), as-prepared TiO$_2$/ACA (c,d), heat-treated TiO$_2$/ACA (e,f), and TiCN/ACA (g,h) at different magnifications. Arrows indicate particles of amorphous (d), crystalline TiO$_2$ (f), and TiCN (h).

DETAILED DESCRIPTION OF SPECIFIC EMBODIMENTS

Figure 1A:
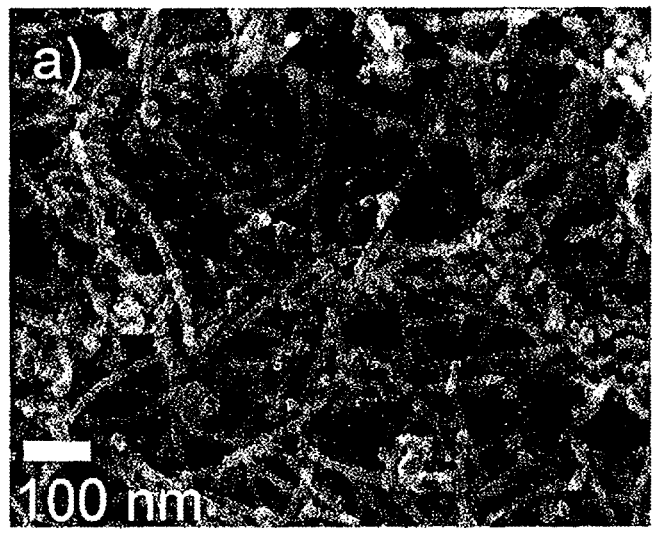
FIGS. 1A and 1B are SEM and TEM images of $TiO_2$/SWNT-CA.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a metal oxide-carbon composite that includes a carbon aerogel with an oxide overcoat. The metal oxide-carbon composite is made by providing a carbon aerogel, immersing the carbon aerogel in a metal oxide sol under a vacuum, returning the carbon aerogel with the metal oxide sol to atmospheric pressure, curing the carbon aerogel with the metal oxide sol-gel at room temperature to produce the metal oxide-carbon wet gel composite, and drying the metal oxide-carbon wet gel composite to produce the metal oxide-carbon aerogel composite. The step of providing a carbon aerogel can be providing an activated carbon aerogel or providing a carbon aerogel with carbon nanotubes that make the carbon aerogel mechanically robust. Apparatus and method of providing an aerogel and a metal oxide are described in U.S. Pat. Nos. 6,986,818, 7,270,851; 7,410,718; U.S. Published Patent Application No. 20090123358; Published Patent Application No. 20090229032; and Published Patent Application No. 20090317619. U.S. Pat. Nos. 6,986,818, 7,270,851; 7,410,718; U.S. Published Patent Application No. 20090123358; Published Patent Application No. 20090229032; and Published Patent Application No. 20090317619 are incorporated herein in their entirety by this reference for all purposes.

Definition of Terms

Various terms used in this patent application are defined below.

CA=Carbon Aerogel
CNT=Carbon Nanotubes
CA-CNT=Carbon Aerogel & Carbon Nanotube Composite
SWNT=Single-Walled Carbon Nanotubes
DWNT=Double-Walled Carbon Nanotubes
SDBS=Sodium Dodecylbenzene Sulfonate
MESOPORPOUS=Pore Dia. 2-50 nm
PVA=Polyvinyl Alcohol
CVD=Chemical Vapor Deposition
TEM=Transmission Electron Microscopy
SEM=Scanning Electron Microscopy
R/C=Resorcinol to Catalyst Ratios
RF=Resorcinol and Formaldehyde Solids
BET=Brunauer-Emmett-Teller
Mechanically Robust=Can withstand strains greater than 10% before fracture
Electrically Conductive=Exhibits an electrical conductivity of 10 S/m or greater
Ultralow-Density=Exhibits densities less than 50 mg/cc
Carbon Nanotube-Based Aerogel=Porous carbon material consisting of 5 to 95% carbon nanotubes by weight

EXAMPLES

The present invention provides a method of making a metal oxide-carbon composite, comprising the steps of providing an aqueous media or other media to form a suspension, adding reactants and catalyst to said suspension to create a reaction mixture, curing said reaction mixture to form a wet get drying said wet gel to produce a dry gel, pyrolyzing said dry gel to produce an aerogel, immersing said aerogel in a metal oxide sol under a vacuum, returning said aerogel and said metal oxide sol to atmospheric pressure, curing said aerogel at room temperature, and drying said aerogel producing an aerogel oxide composite. The metal oxide-carbon composite comprises a carbon aerogel, said carbon aerogel having inner surfaces, and an oxide coating said inner surfaces of said carbon aerogel providing an aerogel oxide composite. In one embodiment the carbon aerogel is a carbon aerogel with carbon nanotubes that make said carbon aerogel mechanically robust. In another embodiment the carbon aerogel is an activated carbon aerogel. In one embodiment the oxide is titanium oxide. In another embodiment the oxide is an oxide from transitional metal oxide made with forming precursors of manganese or iron or cobalt or nickel or copper or zinc or zirconium or tin salts or alkoxides.

Example

Nanocarbon-Supported Titanium Dioxide

The present invention provides the fabrication of new nanocarbon-supported titanium dioxide structures that exhibit high surface area and improved electrical conductivity. Nanocarbons consisting of single-walled carbon nanotubes and carbon aerogel nanoparticles were used to support titanium dioxide particles and produce monoliths with densities as low as 80 mg/cm$^3$. The electrical conductivity of the nanocarbon-supported titanium dioxide was dictated by the conductivity of the nanocarbon support while the pore structure was dominated by the titanium dioxide aerogel particles. The conductivity of the monoliths presented here was 72 S/m and the surface area was 203 m$^2$/g.

Titanium dioxide is a widely researched material with applications ranging from photocatalysts to electrodes to hydrogen storage materials. However, issues such as absorption limited to the ultraviolet range, high rates of electron-hole recombination, and relatively low surface areas have limited commercial use of titanium dioxide. Recent efforts have focused on combining titanium dioxide with various materials to address some of these issues. Titanium dioxide in the presence of carbon (e.g. carbon nanotubes (CNT)) is currently one of the most attractive combinations. While recent work has shown some improvements, surfaces areas and photocatalytic activity are still limited. Maintaining high surface areas while improving electrical conductivities, one could envision charging-discharging rates and photoefficiencies that are significantly higher than currently possible. Unfortunately for CNT composites, improvements in electrical conductivity are often not fully realized due to poor dispersion of CNTs in the matrix material, impeding the formation of a conductive network. However, with a mechanically robust, electrically conductive CNT foam, one could imagine simply coating this low-density CNT scaffold with titanium dioxide, yielding conductive nanocarbon-supported titanium dioxide.

Here Applicants present the synthesis and characterization of such a high-surface area, conductive $TiO_2$/CNT composite. Applicants recently reported the synthesis of a novel CNT-based foam, consisting of bundles of single-walled nanotubes (SWNT) crosslinked by carbon aerogel (CA) nanoparticles, which would serve as an excellent candidate for the CNT scaffold of the $TiO_2$/CNT composite. The SWNT-CA foams simultaneously exhibited increased stiffness, and high electrical conductivity even at densities approaching 10 mg cm$^{-3}$ without reinforcement. The foams are stable to temperatures approaching 1000° C. and have been shown to be unaltered by exposure to extremely low temperatures during immersion in cryogenic liquids. So, in addition to their use in applications such as catalyst supports, sensors, and electrodes, these ultralight, robust foams could allow the formation of novel CNT composites. As the conductive network is already established, it can be impregnated through the wicking process with a matrix of choice, ranging from inorganic sols to polymer melts to ceramic pastes. Thus, a variety of conductive CNT composites could be created using the SWNT-CA foam as a pre-made CNT scaffold. Applicants use the SWNT-CA as a scaffold for the synthesis of conductive, high surface area $TiO_2$/CNT composites.

Experiment

Materials. All reagents were used without further purification. Resorcinol (99%) and formaldehyde (37% in water) were purchased from Aldrich Chemical Co. Sodium carbonate (anhydrous) was purchased from J.T. Baker Chemical Co. Highly purified SWNTs were purchased from Carbon Solutions, Inc.

SWNT-CA preparation. The SWNT-CAs were prepared as described in previous work. Briefly, in a typical reaction, purified SWNTs (Carbon Solutions, Inc.) were suspended in deionized water and thoroughly dispersed using a VWR Scientific Model 75T Aquasonic (sonic power—90 W, frequency—40 kHz). The concentration of SWNTs in the reaction mixture was 0.7 wt %. Once the SWNTs were dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol to catalyst ratios (R/C) employed was 200. The amount of resorcinol and formaldehyde (RF solids) used was 4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical CO2 and pyrolyzed at 1050° C. under a N2 atmosphere for 3 h. The SWNT-CAs materials were isolated as black cylindrical monoliths. Foams with SWNT loadings of 30 wt % (0.5 vol %) were prepared by this method.

$TiO_2$/SWNT-CA composite preparation. Sol-gel chemistry was used to deposit the $TiO_2$ aerogel layer on the inner surfaces of the SWNT-CA support. The $TiO_2$ sol-gel solution was prepared as described in previous work. In a typical synthesis, SWNT-CA parts were immersed in the $TiO_2$ sol-gel solution and full infiltration of the SWNT-CA pore network by the sol-gel solution was achieved under vacuum. Following gelation of the titania network, the wet composite was dried using supercritical $CO_2$, yielding the $TiO_2$/SWNT-CA composite.

Characterization. Bulk densities of the $TiO_2$/SWNT-CA composites were determined from the physical dimensions and mass of each sample. The volume percent of SWNT in each sample was calculated from the initial mass of SWNTs added, assuming a CNT density of 1.3 g/cm$^3$, and the final volume of the aerogel. Scanning electron microscopy (SEM) characterization was performed on a JEOL 7401-F at 10 keV (20 mA) in SEI mode with a working distance of 2 mm. Transmission electron microscopy (TEM) characterization was performed on a JEOL JEM-200CX. Thermogravimetric analysis (TGA) was performed on a Shimadzu TGA 50 Thermogravimetric Analyzer to determine $TiO_2$ content. Samples were heated in flowing air at 10 sccm to 1000° C. at 10° C./min in alumina boats. The weight fraction of material remaining was assumed to be pure stoichiometric $TiO_2$. Energy dispersive spectroscopy confirmed that only $TiO_2$ remained after TGA was performed. Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 300° C. under vacuum (10 Ton) for at least 24 hours to remove all adsorbed species. Electrical conductivity was measured using the four-probe method similar to previous studies. Metal electrodes were attached to the ends of the cylindrical samples. The amount of current transmitted through the sample during measurement was 100 mA and the voltage drop along the sample was measured over distances of 3 to 6 mm. Seven or more measurements were taken on each sample.

Figure 1B:
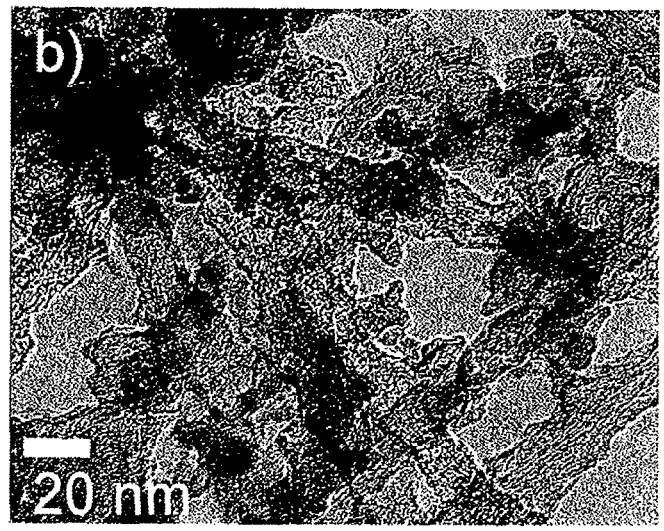

The microstructure of the $TiO_2$/SWNT-CA composites was examined using SEM and TEM. As shown in FIG. 1A and FIG. 1B, the network structure of the $TiO_2$/SWNT-CA composites is similar to that observed in pristine SWNT-CA. The presence of the $TiO_2$ aerogel layer on the surface of the nanotube bundles can be seen in TEM image. Interestingly, the $TiO_2$ aerogel appears to have formed primarily on the surfaces of the nanotube bundles despite the fact that the $TiO_2$ sol-gel solution filled the entire pore volume of the support. The open pore volume in the $TiO_2$/SWNT-CA composite is only sparsely populated with $TiO_2$ particles. This observation indicates that nucleation of the $TiO_2$ particles during the sol-gel reaction preferentially occurs at the surface of the nanotube bundles.

Figure 2:
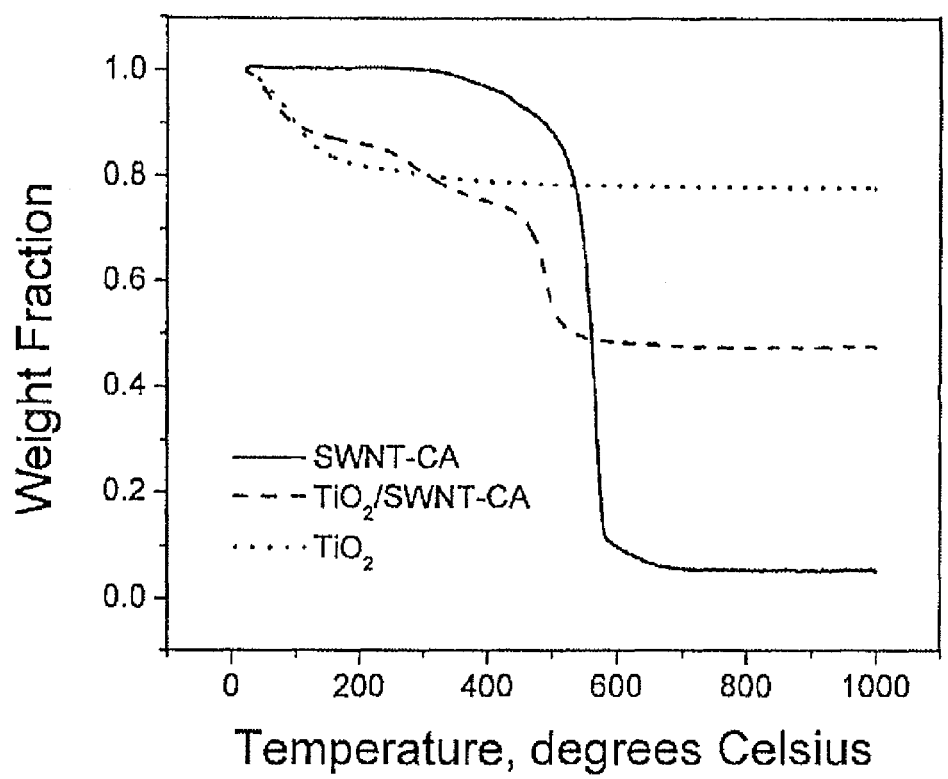
FIG. 2 is a TGA plot of SWNT-CA, $TiO_2$/SWNT-CA, and $TiO_2$ in air.

Thermal gravimetric analysis in air was used to determine the $TiO_2$ content in the as-$TiO_2$/SWNT-CA composites as illustrated in FIG. 2. As expected, combustion of the pristine SWNT-CA occurs around 500° C. and the material is completely consumed by 600° C. The 5 wt % remaining is likely metal catalyst from the CNTs. The titania exhibits an initial mass loss generally attributed to moisture and organics below 300° C. and is stable thereafter. Not surprisingly the TGA plot for $TiO_2$/SWNT-CA material is a composite of the plots for titania and the SWNT-CA. It is interesting to note that the combustion of the SWNT-CA occurs significantly earlier for the $TiO_2$/SWNT-CA compared to that for the pristine SWNT-CA, which may be the result of a catalytic effect of the titania aerogel particles on carbon oxidation. Nevertheless, the nearly 50 wt % remaining after combustion of the SWNT-CA confirm the presence of titania in the TiO$_2$/SWNT-CA composite.

Figure 3:
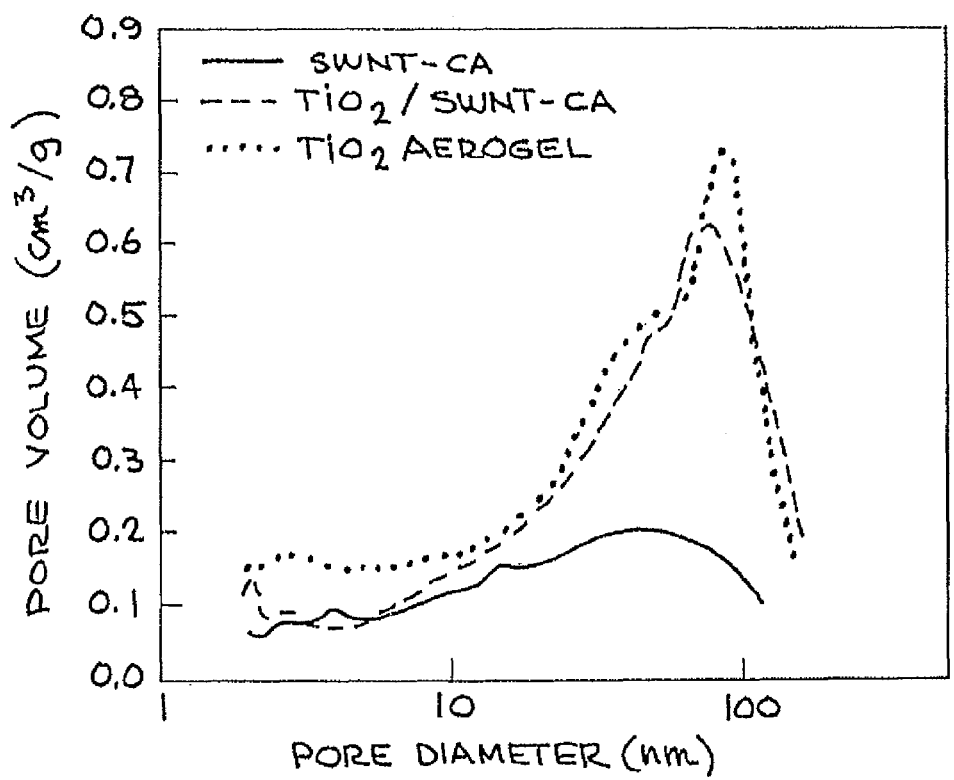
FIG. 3 is Semi-log plot of the pore size distribution of the SWNT-CA, TiO$_2$/SWNT-CA, and TiO$_2$ aerogel.

FIG. 3 plots the pore size distribution of the SWNT-CA, TiO$_2$/SWNT-CA composite, and pristine TiO$_2$ aerogel. The BET surface area, electrical conductivity and other physical properties of these materials are summarized in Table I. Table I shows that the TiO$_2$/SWNT-CA composite has high surface area and electrical conductivity. In fact, the electrical conductivity of the SWNT-CA is not adversely affected by the infiltration of the insulating material. Though, based on the SEM and TEM images (FIG. 1), the titania aerogel appears to simply coat the SWNT-CA scaffold, the increased surface area suggests that the pore morphology of the titania dominates the overall pore morphology of the composite. This is confirmed via the pore size distribution, which shows that the pore size distribution of the TiO$_2$/SWNT-CA is much closer to that of pristine TiO$_2$ aerogel than that of the SWNT-CA. Thus, with the TiO$_2$/SWNT-CA composite, a new class of materials with good electrical conductivity and high surface area are realized.

TABLE 1

Physical properties of SWNT-CA, TiO$_2$/SWNT-CA. and TiO$_2$ aerogel.

| Material | CNT, vol % (wt %) | Density, g/cm$^3$ | $S_{BET}$, m$^2$/g | σ, Scm$^{-1}$ |
|---|---|---|---|---|
| SWNT-CA | 0.5 (30) | 0.030 | 184 | 0.77 |
| TiO$_2$/SWTN-CA | 0.5 (8) | 0.082 | 203 | 0.72 |
| TiO$_2$ aerogel | 0 (0) | 0.193 | 237 | <0.001 |

Applicants have described a straightforward method for the fabrication of electrically conductive, high-surface area TiO$_2$/CNT composites. The novel TiO$_2$/SWNT-CA monoliths was prepared by coating the CNT struts within the SWNT-CA scaffold with amorphous sol-gel-derived TiO$_2$ particles. Given the technological interest in crystalline TiO$_2$, work is in progress to convert the amorphous TiO$_2$ layer to the anatase crystalline phase. The conductive network of the SWNT-CA scaffold remained intact after infiltration yielding a composite with a conductivity of 72 S m-1 and a surface area of 203 in2 g"[1]. Therefore, the SWNT-CAs were shown to provide the means to create conductive, high-surface area TiO$_2$ composites. The general nature of this method should provide a route for the synthesis of a variety of conductive, high surface area composites with applications in photocatalysis and energy storage.

This nanocarbon-supported titanium dioxide example is described in greater detail in the journal article, "Synthesis and Characterization of Nanocarbon-Supported Titanium Dioxide," Author(s): Marcus A Worsley, Joshua D. Kuntz, Octavio Cervantes, T Yong-Jin Han, Peter Pauzauskie, Joe H Satcher, Theodore F Baumann, Paper #: 1174-V03-06, DOI: 10.1557/PROC-1174-V03-06, 2010 MRS Spring Meeting, Material Research Society. The journal article "Synthesis and Characterization of Nanocarbon-Supported Titanium Dioxide," by Marcus A. Worsley, Joshua D. Kuntz, Octavia Cervantes, T. Yong-Jin Han, Peter J. Pauzauskie, Joe H. Satcher, Jr. and Theodore F. Baumann, Mater. Res. Soc. Proc. Vol. 1174, (2009) is incorporated herein in its entirety by this reference for all purposes.

Example

High Surface Area Carbon Nanotube-Supported Titanium Carbonitride Aerogels

Porous transition metal nitrides and carbides have received considerable attention recently as catalysts and catalyst supports. They exhibit high resistance to sintering and poisoning, in addition to catalytic activity for a number of useful reactions. Of particular interest is the fact that these transition metal compounds have been shown to have catalytic activity similar to that of typical noble metal catalysts. Thus, substituting transition metal compounds for noble metals is an attractive option for reducing the cost of catalyst materials. Unfortunately, traditional routes to forming metal nitrides and carbides, such as the carbothermal reduction of metal oxides, yield low surface area materials. To increase the specific surface area of transition metal carbides and nitrides, a number of new synthetic methods have been proposed. One promising approach involves the use of high surface area templates or supports to control the microstructure of the transition metal nitride and carbide. For example, both high surface area SiO$_2$ and C$_3$N$_4$ have been used to form TiN powders with surface areas in excess of 100 m$^2$/g. With surface areas as high as 1000 m$^2$/g, carbon nanotubes (CNT) could also serve as such a high surface area support. There have been a number of studies exploring the deposition of various metal oxides on CNTs, however, to our knowledge, only one study examines depositing a transition metal nitride on CNTs. And while the fabrication of metal nitride or carbide nanostructures has received a lot of attention, the use of CNTs for creating high surface area transition metal nitrides or carbides has not been reported.

Here Applicants report the synthesis and characterization of a monolithic CNT-supported titanium carbonitride aerogel (TiCN/CNT) with surface area in excess of 250 m$^2$/g. This TiCN/CNT was formed by the carbothermal reduction of a TiO$_2$-coated low-density CNT-based foam (TiO$_2$/CNT) in flowing nitrogen. The CNT-based foam (30 wt % CNT, 30 mg cm$^{-3}$) that serves as the support consists of single-walled carbon nanotubes crosslinked by carbon aerogel particles (SWNT-CA), as previously described. To prepare the TiO$_2$/CNT, the SWNT-CA was immersed in a TiO$_2$ sol under vacuum prior to gelation, similar to the method previously reported for fabricating stiff, conductive polymer/CNT composites. The TiO$_2$ sol was prepared via a two-step sol-gel process involving the acid-catalyzed hydrolysis of titanium tetraethoxide, followed by base-initiated gelation of the TiO$_2$ species. Briefly, a solution of titanium tetraethoxide (1.0 g, 4.4 mmol) and pure ethanol (4.5 mL) was prepared in an ice bath with vigorous stirring. Once chilled, hydrochloric acid (37%, 71.4 μL) and deionized water (85.7 μL) were then added to the titanium tetraethoxide/ethanol solution. After five minutes of continuous stirring, propylene oxide (0.36 g, 6.1 mmol) was finally added to the reaction mixture. The reaction mixture was stirred for another five minutes before immersing the SWNT-CA monolith in the TiO$_2$ sol. Vacuum was applied to the reaction vessel to ensure complete infiltration of the TiO$_2$ sol in the SWNT-CA. After infiltration, the TiO$_2$ sol was then allowed to gel in the SWNT-CA under ambient conditions. The wet composite gel was then dried using supercritical CO$_2$, yielding the TiO$_2$/CNT. The TiO$_2$/CNT was then heated under flowing nitrogen at 1400° C. for 4 hours to yield the TiCN/CNT monolith.

Powder X-ray diffraction (XRD) analysis of the samples was performed with Cu Kα radiation on a Scintag PAD-V X-ray diffractometer. TiO$_2$ powder was used as a standard. Bulk densities of the monoliths were determined from the physical dimensions and mass of each sample. Scanning electron microscopy (SEM) and energy-dispersive X-ray spectroscopy (EDX) characterization were performed on a JEOL 7401-F at 5-10 keV (20 mA) in SEI mode with a working distance of 2-8 mm. To supplement EDX, thermogravimetric analysis (TGA) was performed on a Shimadzu TGA 50 Thermogravimetric Analyzer. Samples were heated in air to 1000° C. at 10° C./min in alumina boats. Transmission electron microscopy (TEM) characterization was performed on a JEOL JEM-200CX Electron Microscope operated at 200 kV. Samples for TEM were prepared by pulverizing aerogels above TEM grids. Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 300° C. under vacuum ($10^{-5}$ Torr) for at least 24 hours to remove all adsorbed species prior to analysis. Electrical conductivity was measured using the four-probe method similar to previous studies. Metal electrodes were attached to the ends of cylindrical samples. The amount of current transmitted through the sample during measurement was 100 mA, and the voltage drop along the sample was measured over distances of 3 to 6 mm.

Figure 4A:
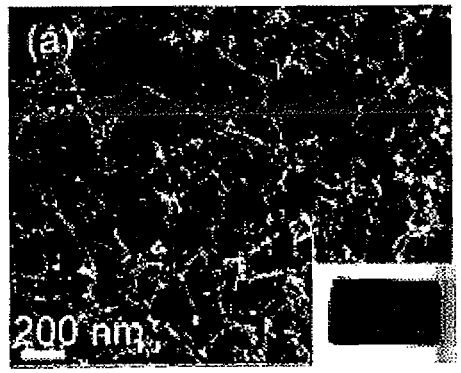
FIGS. 4A-D are SEM images of TiO$_2$/CNT (a, b) and TiCN/CNT (c, d) at different magnifications.
Figure 4B:
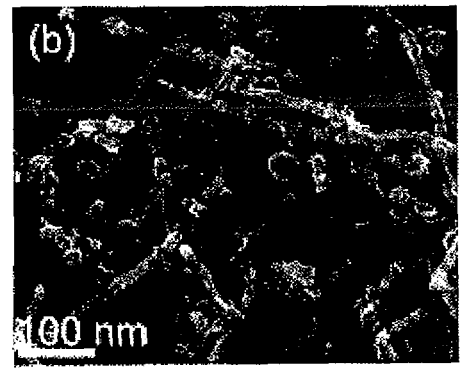
Figure 4C:
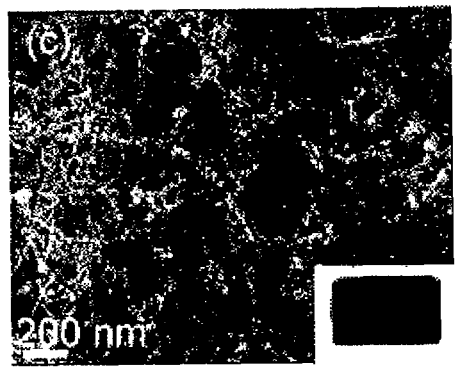
Figure 4D:
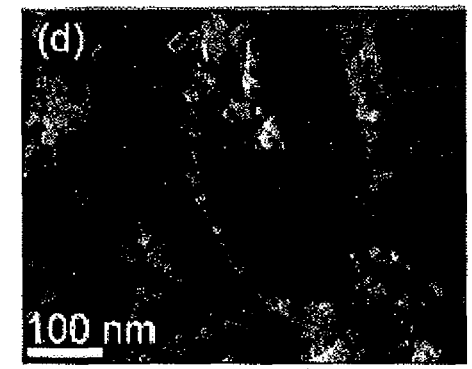
Figure 5A:
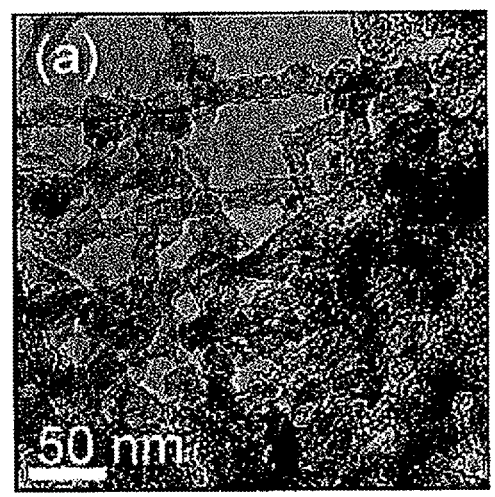
FIGS. 5A and 5B are TEM images of TiO$_2$/CNT and (b) TiCNT/CNT.
Figure 5B:
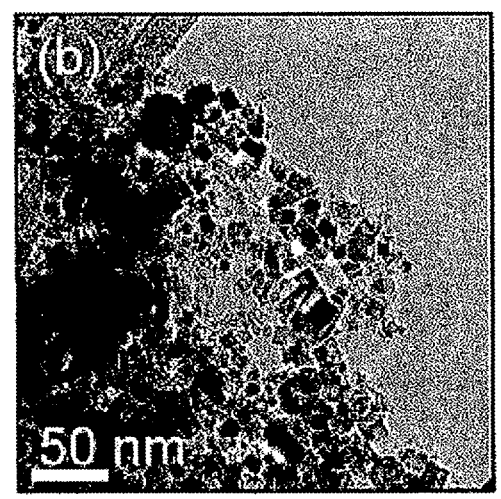

SEM images of the $TiO_2$/CNT, FIG. 4A and FIG. 4B and TiCN/CNT) FIG. 4C and FIG. 4D show the ligament and pore structure of these materials. The $TiO_2$/CNT resembles the CNT-based foam except for the coating of amorphous $TiO_2$. The TEM image of the $TiO_2$/CNT, FIG. 2A, supports this view. The TiCN/CNT also has the same basic structure as the original CNT-based foam except that the ligaments are now decorated with TiCN nanocrystals FIGS. 4B and 4C. This observation suggests that the carbon consumed during the reduction of $TiO_2$ comes primarily from the carbon aerogel coating the CNT bundles, leaving the CNTs intact. The integrity of the CNTs was also confirmed via Raman spectroscopy through observation of the peaks characteristic of CNTs (ESI±) in the TiCN/CNT. The TEM image, FIG. 2B, also shows that the TiCN/CNT ligaments, on average, have smaller diameters than the $TiO_2$/CNT. The smaller diameters probably occur as the $TiO_2$ is reduced and carbon aerogel is consumed in the course of forming the TiCN nanocrystals. The TiCN/CNT had a brownish color compared to the jet-black CNT-based foam and $TiO_2$/CNT.

TABLE II

Density (P), electrical conductivity (σ), and elemental content (Ti, C, N, O) of the composite foams

| Material | P, g cm$^{-3}$ | σ, S cm$^{-1}$ | Ti, at % (wt %) | C, at % (wt %) | N, at % (wt %) | O, at % (wt %) |
|---|---|---|---|---|---|---|
| CNT-based foam | 0.030 | 0.77 | — | 95 (93) | — | 5.0 (6.6) |
| $TiO_2$/CNT | 0.082 | 0.72 | 9.4 (28) | 71 (53) | — | 19 (19) |
| TiCN/CNT | 0.055 | 0.25 | 17 (43) | 65 (43) | 18 (14) | <1 (<1) |

Table II summarizes some basic properties of the TiCN/CNT, as well as the CNT-based foam and $TiO_2$/CNT. The density of the TiCN/CNT is significantly reduced compared to the $TiO_2$/CNT. During the carbothermal reduction, the monolith experienced 49% mass loss and 28% volume shrinkage, resulting in the 55 mg cm$^{-3}$ final density. The electrical conductivity of the TiCN/CNT is diminished compared to the CNT-based foam and $TiO_2$/CNT, but still high considering the extremely low bulk density of the TiCN/CNT foam. The partial consumption during the heat treatment of the graphitic carbon aerogel particles that crosslink the CNT bundles, is likely the cause of the decreased conductivity. Interfacial resistance has been shown to be a dominant factor in the transport properties of CNT composites. The removal or narrowing of the critical conduction pathways between CNT bundles effectively increases the interfacial resistance, leading to a decrease in the bulk conductivity.

Elemental analysis by EDX and TGA suggests that the $TiO_2$ in the $TiO_2$/CNT is completely converted to TiCN in the TiCN/CNT. This observation is consistent with literature on the carbothermal reduction of $TiO_2$ under the conditions of this study. Under a constant supply of nitrogen and excess carbon, it is expected that 100% reduction should occur, assuming temperature and time are chosen appropriately. Previous studies have shown 100% reduction at temperatures as low as 1300° C. for a 4 hour hold time. The roughly 1:1 Ti:N ratio suggests a fairly N-rich TiCN phase was formed. EDX elemental mapping (ESI±) shows an even distribution of elements indicative of a TiCN layer that covers most of the CNT surface. XRD analysis offers more details concerning the composition of the TiCN phase.

Powder XRD was used to determine what phases were present in the TiCN/CNT. For reference, XRD patterns of the CNT-based foam and $TiO_2$/CNT were also included. The largest peaks from the CNT-based foam can be attributed to the (100) and (101) graphite peaks (PDF#41-1487). These peaks are also visible in the pattern from the $TiO_2$/CNT. The absence of additional peaks in the $TiO_2$/CNT pattern supports the earlier suggestion that the $TiO_2$ coating the CNT ligaments is amorphous. The XRD peaks for the TiCN/CNT would indicate the presence of the osbornite crystalline phase of TiCN (PDF#06-642). The calculated lattice parameter, a, for the TiCN/CNT, 4.244 Å is in good agreement with $TiC_{1-x}N_x$ (x=0.95) and very close to the value for pure TiN, 4.240. Peak broadening indicates that the average crystallite size is about 20 nm, consistent with the particle sizes observed in SEM and TEM analysis and. Therefore, based on the XRD data, a highly nitrogen-enriched layer of TiCN nanocrystals covers the CNT bundles Nitrogen adsorption/desorption analysis was performed to determine surface area, pore volume and average pore size of the TiCN/CNT. All three samples had Type IV nitrogen isotherms (ESI±), indicative of the predominantly macroporous nature of the CNT-based foam that serves as the foundation for all the samples. The addition of $TiO_2$ and the conversion to TiCN increased both the surface area and pore volume of the composite foams. Peak pore size increases from 56 nm in the CNT-based foam to 72 nm in the $TiO_2$/CNT and TiCN/CNT. The $TiO_2$/CNT exhibits pore morphology similar to that of an amorphous $TiO_2$ aerogel, suggesting that the $TiO_2$ coating the CNT bundles dominates the nitrogen sorption behavior. The TiCN/CNT maintains the same general morphology as the $TiO_2$/CNT, as evidenced by a similar pore size distribution. However, the surface area and pore volume are increased because of the decreased bulk density and additional porosity due to removal of carbon (in the form of gaseous CO) that occurs during carbothermal reduction. Similar increases in surface area were observed by Berger et al. under similar conditions during the conversion of $TiO_2$ (rutile) and carbon (furnace black or graphite).

In summary, the synthesis of high surface area TiCN/CNT has been shown by the carbothermal reduction of $TiO_2$ in a CNT-based foam. The resulting monolith was conductive, contained N-rich TiCN nanocrystals decorating CNT bundles and had a surface area of 276 m$^2$/g. The straightforward nature of this method should allow for the synthesis of other high surface area CNT-supported metal nitrides (e.g. ZrN, $Si_3N_4$) by simply reducing the respective oxide (e.g. $ZrO_2$, $SiO_2$). Also, by performing the carbothermal reduction in inert gas (e.g. Ar), high surface area carbides (e.g. TiC, SiC) could also be formed. Thus, a new class of monolithic, high surface area CNT-supported carbides and nitrides could be developed with potential for significant contributions in applications such as catalysis.

This high surface area carbon nanotube-supported titanium carbonitride aerogels example is described in greater detail in the journal article "High surface area carbon nanotube-supported titanium carbonitride aerogels," by Marcus A. Worsley, Joshua D. Kuntz, Peter J. Pauzauskie, Octavio Cervantes, Joseph M. Zaug, Alex E. Gash, Joe H. Satcher Jr., and Theodore F. Baumann, *Journal of Materials Chemistry*, 2009, 19, 5503-5506. The in the journal article "High surface area carbon nanotube-supported titanium carbonitride aerogels," by Marcus A. Worsley, Joshua D. Kuntz, Peter J. Pauzauskie, Octavio Cervantes, Joseph M. Zaug, Alex E. Gash, Joe H. Satcher Jr., and Theodore F. Baumann, *Journal of Materials Chemistry*, 2009, 19, 5503-5506 is incorporated herein in its entirety by this reference for all purposes.

Example

High Surface Area $TiO_2/C$ and $TiCN/C$ Composites

Nanocomposites of titania and various forms of carbon (i.e. carbon nanotubes, activated carbons, ordered carbons, etc.) exhibit a number of enhanced functional properties for catalysis and energy-storage applications. Several reports have shown that titania/carbon ($TiO_2/C$) composites have higher photocatalytic activity, improved photoefficiency, and a wider absorption band than titania alone. Composites of $TiO_2/C$ have also been shown to improve the energy and power density of electrochemical cells and enhance the storage capacity and reversibility of hydrogen-storage materials. The efficacy of these composite materials depends mainly on the crystallinity and surface area of the titania species. As a result, significant efforts have been focused on the design of high surface area composites containing either rutile or anatase $TiO_2$. One approach to the fabrication of these composites has been the incorporation of the titania within high surface area supports or scaffolds. While this approach has generated a variety of novel titania composites, the surface areas of the composites are typically lower than those of the scaffolds themselves. The decrease in surface area is generally attributed to blocking of the micropores in the support by the deposited titania, decreasing the accessible surface area. The design of a high surface area support containing bimodal porosity (macro- and micropores) could limit the detrimental effects associated with pore-plugging, thereby providing a route to a new class of high surface area titania composites.

Applicants recently reported the synthesis of activated carbon aerogel (ACA) monoliths that exhibited hierarchical porosity and surface areas in excess of 3000 $m^2g^{-1}$. In this article, Applicants use these materials as scaffolds for the synthesis of high surface area titania and titanium carbonitride (TiCN) composites. The composites are prepared through coating the inner surfaces of monolithic ACA templates with a layer of sol-gel-derived titania, yielding the $TiO_2/ACA$ composite. In a typical synthesis, ACA parts were immersed in the $TiO_2$ sol-gel solution and full infiltration of the ACA pore network by the sol-gel solution was achieved under vacuum. After drying, the amorphous $TiO_2$ overcoat in the composite can then be converted to either anatase $TiO_2$ or titanium carbonitride through heat treatment under different conditions. To convert the amorphous $TiO_2$ layer to anatase, the as-prepared $TiO_2/ACA$ part was heated in air at 400° C. for 2 hours. Alternatively, to prepare the TiCN-coated ACA composite, the as-prepared $TiO_2/ACA$ part was heated under flowing nitrogen at 1400° C. for 4 hours. In both cases, the heat-treated composite materials exhibit extremely high BET surface areas (>1800 $m^2 g^{-1}$) and retain the porous network structure of the monolithic ACA support. Because of the technological importance of titania and its well-documented conversion to $TiC_{1-x}N_x$ (0<x<1) via carbothermal reduction, these systems were chosen to demonstrate the potential of the ACA as a scaffolding material. Nevertheless, the approach described here is general and can be applied to the fabrication of other high surface area metal oxide, metal nitride and metal carbide composites of interest.

Figure 7A:
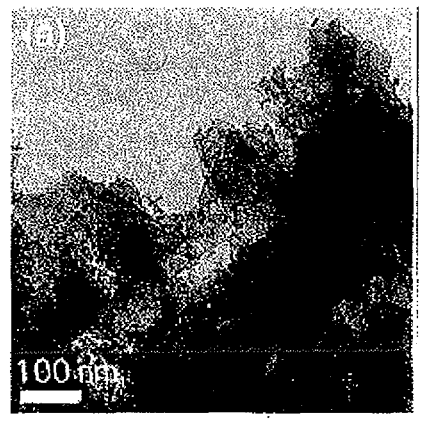
FIGS. 7A-C are transmission electron microscopy images of as-prepared TiO$_2$/ACA (a), heat-treated TiO$_2$/ACA (b), and TiCN/ACA (c).
Figure 7B:
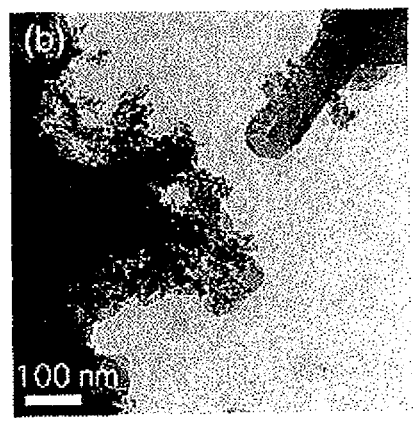
Figure 7C:
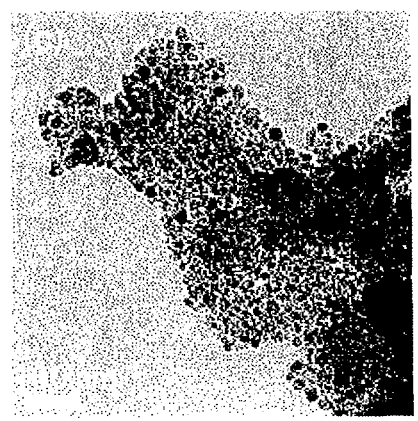

The microstructures of the titania-ACA composites were evaluated using scanning electron microscopy FIGS. 6A-D and transmission electron microscopy FIGS. 7A-C. SEM images of as-prepared $TiO_2/ACA$ FIGS. 6C-D show the same trabecular structure and texture as observed in the pristine ACA FIGS. 6A-B. The presence of the $TiO_2$ aerogel layer on the surface of the ACA can be seen in images of the as-prepared $TiO_2/ACA$ composites. Interestingly, the $TiO_2$ aerogel appears to have formed primarily on the surfaces of the ACA despite the fact that the $TiO_2$ sol-gel solution filled the entire pore volume of the support. As seen in FIGS. 7C-D and FIG. 7A, the open pore volume in the ACA composite is only sparsely populated with $TiO_2$ particles. This observation indicates that nucleation of the $TiO_2$ particles during the sol-gel reaction preferentially occurs at the surface of the ACA. After heat treatment at 400° C., the texture of the $TiO_2/ACA$ composite appears to roughen, apparently due to the formation of anatase $TiO_2$ nanocrystals on the ACA surface FIG. 6E-F and FIG. 7C. Further changes in texture are seen after carbothermal reduction of the surface layer of $TiO_2$ to TiCN FIG. 6G-H and FIG. 7C. In the TiCN/ACA composite, cubic TiCN crystals ranging in size from 10 to 100 nm are clearly visible on the ACA surface. The continuous nature of the crystalline TiCN layer suggests that the deposited $TiO_2$ completely coated the entire surface of the ACA support. With the bulk of the $TiO_2$ deposited at the ACA surface, the number of $TiO_2$ particles formed in sol filling the free space in the ACA is greatly reduced.

Thermal gravimetric analysis in air was used to determine the $TiO_2$ content in the as-prepared and annealed $TiO_2/ACA$ composites as well as the TiCN content in the TiCN/ACA composite. As expected, combustion of the pristine ACA begins oxidizing at 400° C. and the material is completely consumed by 600° C. The onset of mass loss for the annealed $TiO_2/ACA$ composite is similar to that of the ACA, but the material retains 20% of its original mass due to the presence of the $TiO_2$ overcoat Table III. In contrast to the ACA and $TiO_2/ACA$ materials, the TiCN/ACA composite exhibits a slight weight gain at ~350° C. prior to combustion of the carbon support. The increase in mass can be attributed to oxidation of the TiCN layer (molecular weight of 60-62) to $TiO_2$ (molecular weight of 80). Interestingly, complete oxidation of the ACA support in the TiCN/ACA composite does not occur until 680° C. as compared to 600° C. for the other samples, suggesting that the TiCN completely covers the ACA surface, providing an effective barrier to oxygen diffusion. In addition, the energy dispersive X-ray spectroscopy (EDX) element mapping of the TiCN/ACA shows an even distribution of Ti, C, and N, consistent with a TiCN layer covering most of the ACA, as observed in the SEM and TEM images. Only after the TiCN is converted to the oxide does combustion of the ACA occur. The remaining 18 wt % $TiO_2$ from combustion of the TiCN/ACA composite implies a starting TiCN content of 14 wt %.

TABLE III

Physical properties for the ACA support, TiO$_2$ aerogel and the ACA composites

| Material | TiO$_2$/ wt % | Monolithic density/ g cm$^{-3}$ | $S_{BET}$/ m$^2$ g$^{-1}$ | $V_{total}$/ cm$^3$ g$^{-1}$ | $V_{micro}$/ cm$^3$ g$^{-1}$ |
|---|---|---|---|---|---|
| ACA | 0 | 0.140 | 2455 | 1.05 | 0.42 |
| TiO$_2$ aerogel (as prepared) | 78 | 0.193 | 237 | 0.53 | — |
| TiO$_2$ aerogel (heat-treated) | 99 | n.a.$^a$ | 141 | 0.33 | — |
| TiO$_2$/ACA (as prepared) | 15 | 0.230 | 1507 | 0.91 | 0.50 |
| TiO$_2$/ACA (heat treated) | 20 | 0.104 | 2054 | 1.30 | 0.61 |
| TiCN/ACA | 14$^b$ | 0.148 | 1838 | 1.01 | 0.43 |

$^a$The heat-treated TiO$_2$ aerogel was isolated as a powder.
$^b$TiCN content shown for TiCN/ACA.

Powder XRD was used to determine the crystalline phases of the heat-treated TiO$_2$/ACA and TiCN/ACA composites. For comparison, the XRD pattern of the ACA was also included. The XRD pattern for the as-prepared TiO$_2$/ACA (no heat treatment) was very similar to that of the ACA, likely due to the amorphous nature of the titania, and is, therefore, not shown. The largest peaks in the diffraction pattern for the ACA material can be attributed to the (100) and (101) graphite peaks (PDF#41-1487). These peaks are also visible in the diffraction patterns for the heat-treated TiO$_2$/ACA and TiCN/ACA composites due to the presence of the ACA support. The remaining peaks in the XRD pattern for the annealed TiO$_2$/ACA composite can be indexed to the anatase phase of TiO$_2$ (PDF#21-1272). Analysis of the peaks using the Scherrer equation indicates the average crystallite size is ~9 nm, in agreement with the small size of the crystals observed by electron microscopy. The XRD peaks for the TiCN/ACA composite indicate the presence of the osbornite crystalline phase of TiCN (PDF#06-0642) on the ACA support. The calculated lattice parameter, a, for the TiCN in the TiCN/ACA, 4.248 Å, is in good agreement with TiC$_{1-x}$N$_x$ (x=0.90) and very close to the value for pure TiN, 4.240. The high nitrogen content is consistent with EDX results showing a Ti:N ratio of close to one. The average crystallites size calculated from the XRD data (~20 nm) correlates with the size range of the cubic crystals observed in SEM and TEM analysis. Therefore, based on the XRD data, the heat-treated TiO$_2$/ACA composite contained purely anatase nanocrystals, and full reduction of TiO$_2$ to TiCN was achieved in the TiCN/ACA composite to create a highly nitrogen-enriched layer of TiCN nanocrystals on the ACA surface.

The textural properties of the TiO$_2$/ACA and TiCN/ACA composites were evaluated using nitrogen adsorption/desorption analysis Table III. For comparison, data for the ACA and TiO$_2$ aerogel (before and after heat treatment) are also included in Table III. Nitrogen adsorption/desorption plots for the ACA and the composites. Each of the composites exhibited type II nitrogen isotherms, indicating a mostly microporous (<2 nm) material with the remaining pore volume primarily in the large meso- and macropore (>90 nm) range. Coating of the ACA framework with TiO$_2$ clearly results in a significant decrease in BET surface area (1507 m$^2$ g$^{-1}$) relative to the uncoated ACA. Nevertheless, the surface area of the as-prepared TiO$_2$/ACA composite represents almost an order of magnitude improvement over that of the as-prepared TiO$_2$ aerogel. Retention of such a large BET surface area in the coated material suggests that the ACA is less susceptible to the negative effects of pore-plugging observed in other scaffold materials, such as activated carbons. Additionally, heat treatment of the as-prepared TiO$_2$/ACA leads to a 36% increase in surface area in the annealed composite (2054 m$^2$ g$^{-1}$). This observation is in contrast to the sharp decrease in surface area that occurs upon annealing of the bulk TiO$_2$ aerogel prepared without the scaffold. The increased surface area and pore volume in the annealed composite indicate that the ACA support prevents coarsening and collapse of the TiO$_2$ coating during heat treatment, even as the amorphous titania is converted to the anatase phase. The presence of high-surface area SiO$_2$ has been shown to have similar effects on the temperature stability of pores in TiO$_2$ gels. In addition; correspondingly lower density of the annealed TiO$_2$/ACA (relative to as-prepared TiO$_2$/ACA) is consistent with a lack of pore collapse and likely contributes to the observed textural properties. Similarly, the TiCN/ACA composite also exhibits increased surface area and pore volume relative to the as-prepared TiO$_2$/ACA composite Table III. The increased surface area can be attributed to the additional porosity created by the removal of carbon from the ACA support (in the form of gaseous CO) that occurs during carbothermal reduction. Similar increases in surface area have been reported under similar conditions during the conversion of TiO$_2$ (rutile) and carbon (furnace black or graphite) mixtures to TiCN. While the surface area and pore volume for the TiCN/ACA composite are slightly lower than those of the heat-treated TiO$_2$/ACA, the textural properties are still quite close to those of the original ACA. This observation demonstrates the flexibility of the ACA scaffold for creating a variety of high surface area oxide, carbide and nitride materials.

In a typical synthesis, titanium(IV) ethoxide (1 g, 0.0125 mol) and ethanol (3.57 g, 0.0776 mol), hydrochloric acid (71.4 μL), and water (85.7 μl) were mixed in an ice bath, followed by the addition of propylene oxide (0.357 g, 0.00616 mol) to prepare the titania sol. An activated carbon aerogel monolith was immersed in the titania sol in a glass vial and held under vacuum to ensure full penetration of the sol in the carbon aerogel. The reaction mixture was then cured at room temperature for 24 h. The wet composite was washed in ethanol and dried by supercritical extraction in CO$_2$ to yield the TiO$_2$/ACA composite Annealing the as-prepared TiO$_2$/ACA composite in air at 400° C. for 2 h was required to convert the amorphous titania layer on the ACA to the anatase phase. Alternatively, heating the as-prepared TiO$_2$/ACA composite in flowing nitrogen at 1400° C. for 4 h produced the TiCN/ACA composite.

Powder X-ray diffraction (XRD) analysis of the samples was performed with Cu Kα radiation on a Scintag PAD-V X-ray diffractometer. TiO$_2$ (anatase) powder was used as a standard. Bulk densities of the monoliths were determined from the physical dimensions and mass of each sample. Scanning electron microscopy (SEM) and energy-dispersive X-ray spectroscopy (EDX) characterization was performed on a JEOL 7401-F at 5-10 keV (20 mA) in SEI mode with a working distance of 2-8 mm. Transmission electron microscopy (TEM) characterization was performed on a JEOL JEM-200CX electron microscope operated at 200 kV. Thermogravimetric analysis (TGA) was performed on a Shimadzu TGA 50 thermogravimetric analyzer to determine TiO$_2$ and TiCN contents. Samples were heated in flowing air at 10 sccm to 1000° C. at 10° C. min$^{-1}$ in alumina boats. The weight fraction of material remaining was assumed to be pure stoichiometric TiO$_2$. The TiCN content of the TiCN/ACA was calculated from the weight fraction of TiO$_2$ remaining after heating to 1000° C. in air assuming full oxidation of initial TiCN content. Energy dispersive spectroscopy confirmed that only TiO$_2$ remained after TGA was performed. Surface area determination and pore volume analysis were performed by Brunauer-Emmett-Teller (BET) and Barrett-Joyner-Halenda (BJH) methods using an ASAP 2000 surface area analyzer (Micromeritics Instrument Corporation). Samples of approximately 0.1 g were heated to 300° C. under vacuum ($10^{-5}$ Torr) for at least 24 h to remove all adsorbed species, prior to analysis.

In conclusion, the synthesis and characterization of $TiO_2$/ACA and TiCN/ACA composites with the highest surfaces areas yet reported has been described. The flexibility of the described method should allow for synthesis of other high surface area metal oxides, carbides, and nitrides through the use of supports with bimodal porosity, like the ACA, to minimize pore-plugging effects. This new class of high-surface area materials should be especially advantageous in technologies such as catalysis and energy storage where high surface area and accessible pore volume are desired.

This high surface area $TiO_2$/C and TiCN/C composites example is described in greater detail in the journal article "high surface area $TiO_2$/C and TiCN/C composites," by Marcus A. Worsley, Joshua D. Kuntz, Octavio Cervantes, T. Yang-Jin Han, Alex E. Gash, Joe H. Satcher, Jr and Theodore F. Baumann, *Journal of Materials Chemistry*, 2009, 19, 7146-7150. The journal article "high surface area $TiO_2$/C and TiCN/C composites," by Marcus A. Worsley, Joshua D. Kuntz, Octavio Cervantes, T. Yong-Jin Han, Alex E. Gash, Joe H. Satcher, Jr and Theodore F. Baumann, *Journal of Materials Chemistry*, 2009, 19, 7146-7150 is incorporated herein in its entirety by this reference for all purposes.

Example

Improved Thermal Stability for High Surface Area $SiO_2$/C and SiC/C Composites

The synthesis and characterization of high surface area carbon-supported silica and silicon carbide aerogels are described. An activated carbon aerogel with surface area greater than 3000 $m^2$/g was used to as a support for the sol-gel deposition of silica. The resulting silica-coated carbon aerogel retained a surface area greater than 2000 $m^2$/g and showed improved thermal stability in air. The carbon-supported silicon carbide aerogel was made by the carbothermal reduction of the silica-coated carbon aerogel under flowing Ar at 1500° C. The resulting monolith maintained a surface area greater than 2000 $m^2$/g and was stable to temperatures approaching 600° C., over 100° C. higher than that of the pristine carbon aerogel.

Figure 8A:
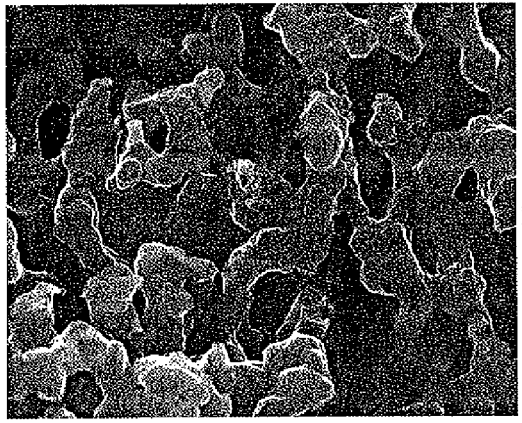
FIGS. 8A-D are SEM images of as-prepared SiO$_2$/ACA and SiC/ACA.
Figure 8B:
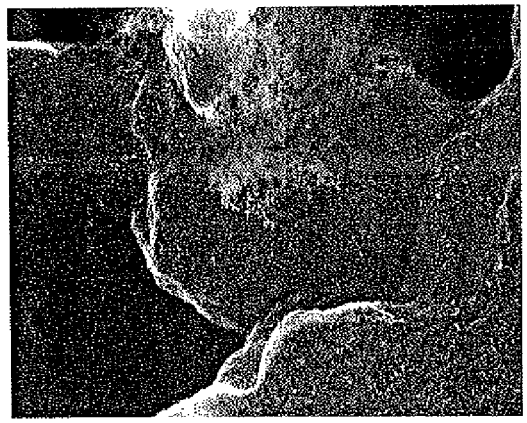
Figure 8C:
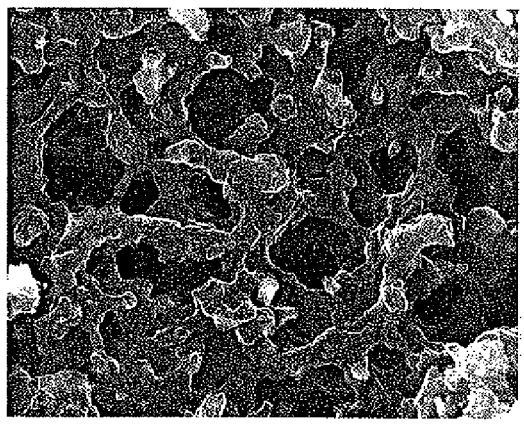
Figure 8D:
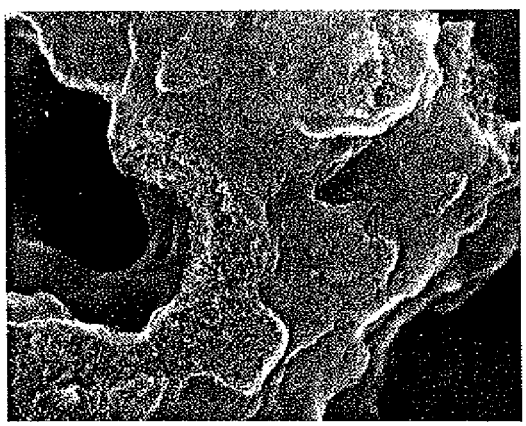

The microstructures of the silica-ACA composites were evaluated using scanning electron microscopy FIGS. 8A and 8E. SEM images of as-prepared $SiO_2$/ACA. FIGS. 8A and 8E show the same trabecular structure and texture as observed in the pristine ACA. The presence of the $SiO_2$ aerogel layer on the surface of the ACA can be seen in images of the as-prepared $SiO_2$/ACA composites. Interestingly, the $SiO_2$ aerogel appears to have formed primarily on the surfaces of the ACA despite the fact that the $SiO_2$ sol-gel solution filled the entire pore volume of the support. As seen in FIGS. 8A and 8E, the open pore volume in the ACA composite is only sparsely populated with $SiO_2$ particles. This observation indicates that nucleation of the $SiO_2$ particles during the sol-gel reaction preferentially occurs at the surface of the ACA. Further changes in texture are seen after carbothermal reduction of the surface layer of $SiO_2$ to SiC (FIGS. 8C and 8D). In the SiC/ACA composite, virtually no particles are visible in the open pore volume. In fact, the SiC/ACA appears to have the same texture as the pristine ACA suggesting the SiC forms a fairly conformal layer on the ACA. Similar results were observed in the case of $TiO_2$ and TiCN on ACA.

Energy dispersive x-ray analysis was used to track the composition change of the composite during the carbothermal reduction. Oxygen atomic content was used to determine the level of reduction as the $SiO_2$/ACA was populated with $SiO_2$ particles. This observation indicates that nucleation of the $SiO_2$ particles during the sol-gel reaction preferentially occurs at the surface of the ACA. Further changes in texture are seen after carbothermal reduction of the surface layer of $SiO_2$ to SiC (FIG. 8A-D). In the SiC/ACA composite, virtually no particles are visible in the open pore volume. In fact, the SiC/ACA appears to have the same texture as the pristine ACA suggesting the SiC forms a fairly conformal layer on the ACA. Similar results were observed in the case of $TiO_2$ and TiCN on ACA.

The carbothermal reduction was considered complete when the O content in the solid phase is reduced to zero. At 1500° C. the O content drops from 12 at % to 3 at % within the first 10 minutes suggesting formation of an $Si_xO_yC_z$ phase. The Si and C content show corresponding increases during this initial period. The O content then slowly decreases to zero over the next 5 h. The Si and C content remain fairly constant. Based on these results, it was concluded that a 5 h treatment at 1500° C. was sufficient to completely convert the $SiO_2$ layer in the $SiO_2$/ACA to SiC. This is consistent with literature on SiC synthesis.

Powder XRD was used to confirm the presence of SiC in the SiC/ACA composite. For comparison, the XRD pattern of the as-prepared $SiO_2$/ACA was also included. The XRD pattern for the pristine ACA is identical to that of the $SiO_2$/ACA, due to the amorphous nature of the as-prepared silica, and is, therefore, not shown. The largest peaks in the diffraction pattern for the $SiO_2$/ACA material can be attributed to the (100) and (101) graphite peaks. These peaks are also visible in the diffraction pattern for the SiC/ACA composites due to the presence of the ACA support. The remaining peaks in the XRD pattern for the SiC/ACA composite can be indexed to moissanite SiC. Analysis of the peaks using the Scherrer equation indicates the average crystallite size is ~26 nm. Therefore, based on the XRD and EDX data, full reduction of $SiO_2$ to SiC was achieved in the SiC/ACA composite to create a layer of SiC nanocrystals on the ACA surface.

Thermal gravimetric analysis in air was used to determine the thermal stability of the $SiO_2$/ACA and SiC/ACA, as well as the $SiO_2$ and SiC content. As expected, combustion of the pristine ACA begins at 400° C. and the material is completely consumed by 600° C. The mass loss event below 200° C. for the $SiO_2$/ACA is due to organic impurities from the as-prepared $SiO_2$. The onset of ACA mass loss for the $SiO_2$/ACA composite is ~100° C. higher than that of the pristine ACA, suggesting that the $SiO_2$ covers the ACA surface fairly well and forms a decent barrier to oxygen diffusion. Similar improvements in thermal stability were noted with a TiCN/ACA. In the case of TiCN/ACA, the TiCN was completely oxidized to $TiO_2$ in the process, in contrast to the $SiO_2$ in the $SiO_2$/ACA. For the $SiO_2$/ACA, complete oxidation of the ACA occurs at 690° C. This material retains 15% of its original mass due to the presence of the $SiO_2$ overcoat. Further improvements in thermal stability are observed in the SiC/ACA composite. Mass loss does not begin until close to 600° C. and complete oxidation of the carbon support does not occur until 720° C. Like the $SiO_2$/ACA, this improved thermal stability suggests that the SiC completely covers the ACA surface, providing an effective barrier to oxygen diffusion. The remaining 10% material remaining represents oxidation-resistant SiC.

The textural properties of the $SiO_2$/ACA and SiC/ACA composites were evaluated using nitrogen adsorption/desorption analysis (Table 1). Each of the composites exhibited type II nitrogen isotherms, indicating a mostly microporous (<2 nm) material with the remaining pore volume primarily in the large meso- and macropore (>90 nm) range. Coating of the ACA framework with $SiO_2$ clearly results in a significant decrease in BET surface area (2288 $m^2$/g) relative to the uncoated ACA. Nevertheless, the surface area of the as-prepared $SiO_2$/ACA composite represents almost an order of magnitude improvement over that of the as-prepared $SiO_2$ aerogel. Retention of such a large BET surface area in the coated material suggests that the ACA is less susceptible to the negative effects of pore-plugging observed in other scaffold materials, such as activated carbons.

After carbothermal reduction, the textural properties show little change. There is small loss of surface area and pore volume, likely due to sintering that occurs during the reduction process. While the surface area and pore volume for the SiC/ACA composite are slightly lower than those of the heat-treated $SiO_2$/ACA, the textural properties are still quite close to those of the original ACA. This observation demonstrates the effectiveness of the ACA scaffold for creating high surface area oxide and carbide materials.

Experimental

In a typical synthesis, trimethoxysilane (IV) ethoxide (4.1 g) and methanol (14 g), ammonium hydroxide (200 ml), and water (1.5 g) were mixed to prepare the silica sol. An activated carbon aerogel monolith was immersed in the silica sol in a glass vial and held under vacuum to ensure full penetration of the sol in the carbon aerogel. The reaction mixture was then cured at room temperature for 24 h. The wet composite was washed in ethanol and dried by supercritical extraction in $CO_2$ to yield the $SiO_2$/ACA composite. Heating the as-prepared $SiO_2$/ACA composite in flowing argon at 1500° C. for 5 h produced the SiC/ACA composite.

Powder x-ray diffraction (XRD) analysis of the samples was performed with Cu $K_\alpha$ radiation on a Scintag PAD-V X-ray diffractometer. $TiO_2$ (anatase) powder was used as a standard. Bulk densities of the monoliths were determined from the physical dimensions and mass of each sample. Scanning electron microscopy (SEM) and energy-dispersive x-ray spectroscopy (EDX) characterization was performed on a JEOL 7401-F at 5-10 keV (20 mA) in SEI mode with a working distance of 2-8 mm. Transmission electron microscopy (TEM) characterization was performed on a JEOL JEM-200CX Electron Microscope operated at 200 kV. Thermogravimetric analysis (TCA) was performed on a Shimadzu TCA 50 Thermogravimetric Analyzer to determine $SiO_2$ and SiC content. Samples were heated in flowing air at 10 sccm to 1000° C. at 10° C./min in alumina boats. The weight fraction of material remaining was assumed to be pure stoichiometric $SiO_2$ and SiC. Surface area determination and pore volume analysis were performed by Brunauer-Emmett-Teller (BET) and Barrett-Joyner-Halenda (BJH) methods using an ASAP 2000 Surface Area Analyzer (Micromeritics Instrument Corporation).[42] Samples of approximately 0.1 g were heated to 300° C. under vacuum ($10^{-5}$ Torr) for at least 24 h to remove all adsorbed species, prior to analysis.

The synthesis and characterization of $SiO_2$/ACA and SiC/ACA composites with the highest surfaces areas yet reported has been described. The flexibility of the described method should allow for synthesis of other high surface area metal oxides, carbides, and nitrides through the use of supports with bimodal porosity, like the ACA, to minimize pore-plugging effects. This new class of high-surface area materials should be especially advantageous in technologies such as catalysis and energy storage where high surface area and accessible pore volume are desired.

Figure 9A:
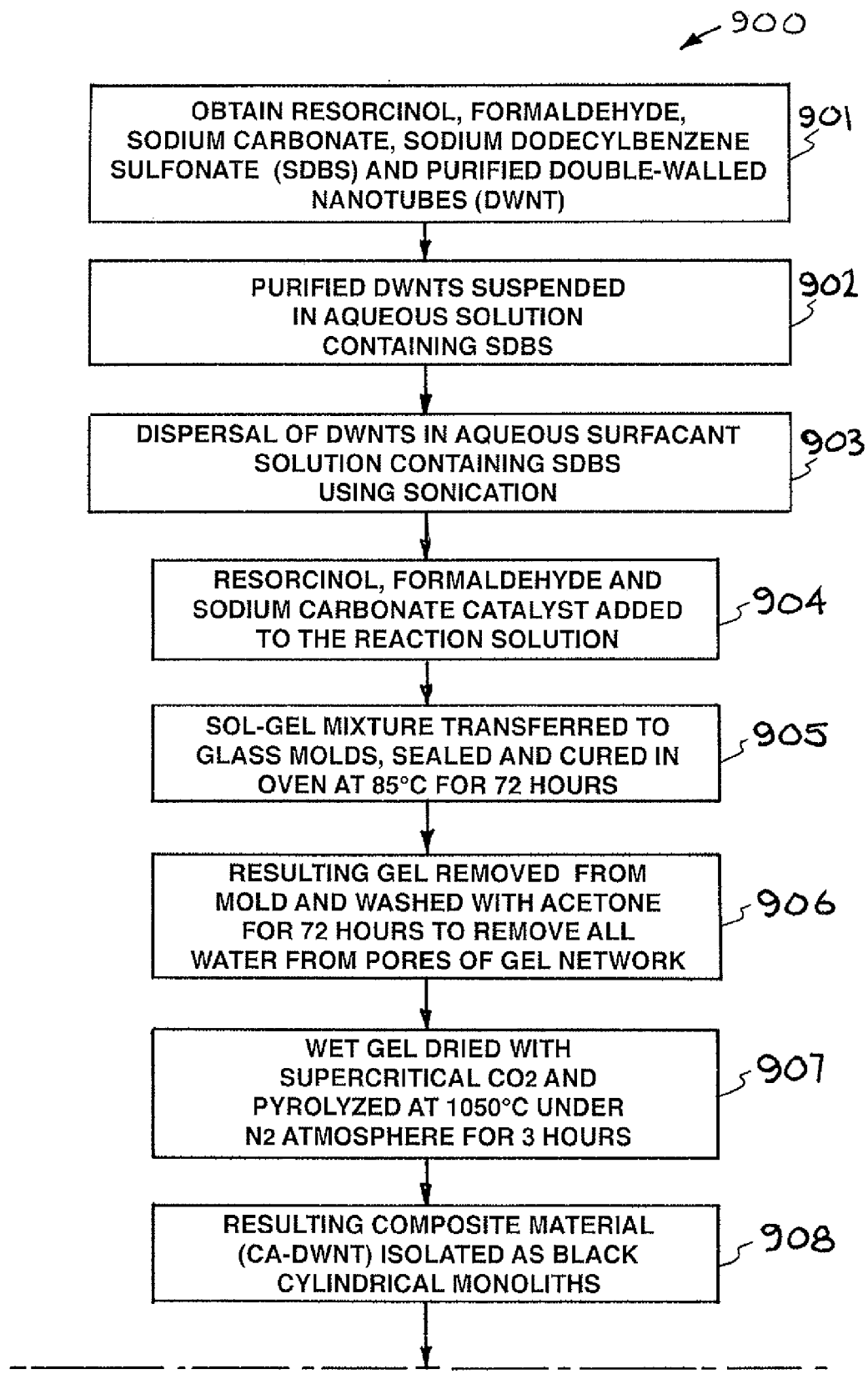
FIG. 9 is a flow chart showing one embodiment of a method of making a metal oxide-carbon composite with carbon nanotubes that make said metal oxide-carbon composite mechanically robust.

Referring now to FIG. 9 a flow chart illustrates one embodiment of a method of making a carbon aerogel oxide composite in accordance with the present invention. The method is designated generally by the reference number 900. The method 900 includes a number of steps. The steps include dispersing nanotubes in an aqueous media or other media to form a suspension, adding reactants and catalyst to the suspension to create a reaction mixture, curing the reaction mixture to form a wet gel, drying the wet gel to produce a dry gel, pyrolyzing the dry gel to produce a carbon nanotube-based aerogel, immersing the carbon nanotube-based aerogel in a metal oxide sol under a vacuum, returning the carbon nanotube-based aerogel and the metal oxide sol to atmospheric pressure, curing the metal oxide-carbon nanotube-based composite at room temperature, and drying the metal oxide-carbon nanotube-based wet gel composite producing an metal oxide-carbon composite. In one embodiment the step of immersing the carbon nanotube-based aerogel in a metal oxide sol under a vacuum comprises immersing the carbon nanotube-based aerogel in titanium dioxide. In one embodiment the step of immersing the carbon nanotube-based aerogel in a metal oxide sol under a vacuum comprises immersing the carbon nanotube-based aerogel in a metal oxide sol made from Mn, Fe, CO, Ni, Cu, Sn, Al, Si, Zn, Zr sol-gel precursors in combination with catalyst, and sol-gel forming components. Referring again to FIG. 9, the method 900 includes a number of steps. The steps shown include the steps described below.

Step number 901 is "Obtain resorcinol, form-aldehyde, sodium carbonate, sodium dodecylbenzene sulfonate (SDBS) and purified double-walled nanotubes (DWNT)."

Step number 902 is "Purified DWNTS suspended in aqueous solution containing SDBS."

Step number 903 is "Dispersal of DWNTS in aqueous surfactant solution containing SDBS using sonication."

Step number 904 is "Resorcinol, formaldehyde and sodium carbonate catalyst added to the reaction solution."

Step number 905 is "Sol-Gel mixture transferred to glass molds sealed and cured in oven at 85° C. for 72 hours."

Step number 906 is "Resulting gel removed from mold and washed with acetone for 72 hours to remove all water from pores of gel network."

Step number 907 is "Wet gel dried with supercritical $CO_2$ and pyrolyzed at 1050° C. under $N_2$ atmosphere for 3 hours."

Step number 908 is "Resulting composite material (CA-DWNT) isolated as black cylinder monoliths."

Step number 909 is "Immerse in titanium dioxide ($TiO_2$) sol: infiltration of pore network achieved under vacuum."

Step number 910 is "Return to atmospheric pressure and dry wet composite using supercritical $CO_2$ producing a metal oxide-carbon composite.

Figure 10B:
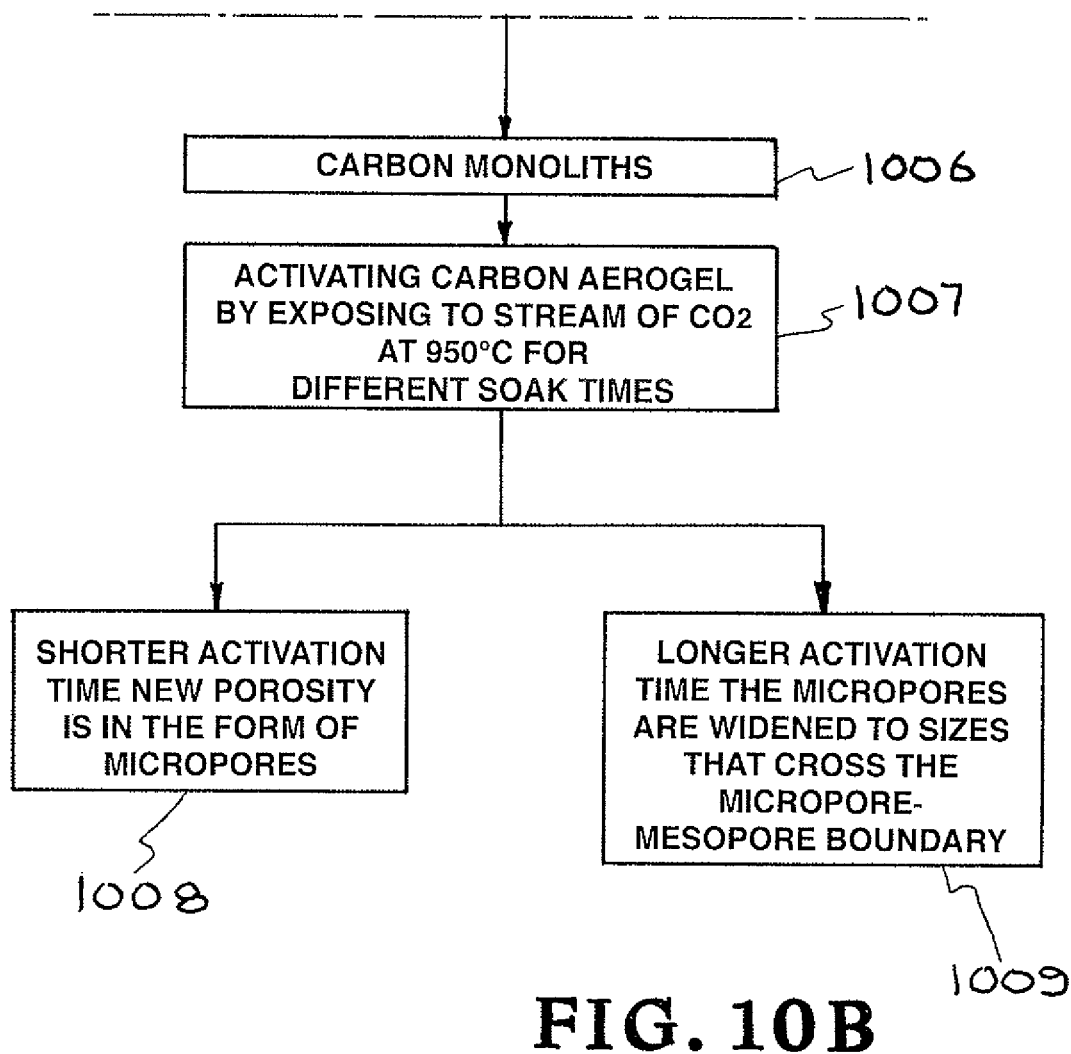
FIG. 10 is a flow chart showing one embodiment of a method of making an metal oxide-carbon composite with an activated carbon aerogel.

Referring now to FIG. 10 a flow chart illustrates an embodiment of a method of making a metal oxide-carbon aerogel composite in accordance with the present invention. The method is designated generally by the reference number 1000. The method 1000 includes a number of steps. The steps include providing an aqueous media or other media to form a suspension, adding reactants and catalyst to the suspension to create a reaction mixture, curing the reaction mixture to form a wet get drying the wet gel to produce a dry gel, pyrolyzing the dry gel to produce an aerogel immerse the aerogel in a metal oxide sol under a vacuum, returning the aerogel and the metal oxide sol to atmospheric pressure, curing the metal oxide sol-infiltrated carbon aerogel, and drying the metal oxide-carbon wet gel composite producing a metal oxide-carbon aerogel composite. In one embodiment the step of immersing the carbon aerogel in a metal oxide sol under a vacuum comprises immersing the carbon aerogel in titanium dioxide sol. In one embodiment the step of immersing the carbon aerogel in a metal oxide sol under a vacuum comprises immersing the carbon aerogel in a metal oxide sol made from Mn, Fe, Co, Ni, Cu, Zn, Zr sol-gel precursors in combination with a catalyst, and sol-gel forming components.

Referring again to FIG. 10, the method 1000 includes a number of steps. The steps shown include the steps described below.

Step number 1001 is "Resorcinol and 37% formaldehyde solution dissolved in water."

Step number 1002 is "Add glacial acetic acid."

Step number 1003 is "Transferred to glass molds and cured at 80° C. for 72 hours."

Step number 1004 is "Resultant organic hydrogels washed with acetone to remove water and dried with supercritical $CO_2$."

Step number 1005 is "Organic aerogels carbonized at 1050° C. for 3 hours under $N_2$ atmosphere."

Step number 1006 is "Carbon monoliths."

Step number 1007 is "Activating carbon aerogel by exposing to stream of $CO_2$ at 950° for different soak times."

Step number 1008 is "Shorter activation time new porosity is in the form of micropores."

Step number 1009 is "Longer activation time. The micropore are widened to sizes that cross the micropore mesopore boundry."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a metal oxide-carbon composite, comprising the steps of:
    providing a carbon aerogel,
    immersing said carbon aerogel in a metal oxide sol under a vacuum,
    returning said carbon aerogel with said metal oxide sol to atmospheric pressure,
    curing said carbon aerogel with said metal oxide sol to produce a metal oxide-carbon wet gel composite, and
    drying said metal oxide-carbon wet gel composite so producing a metal oxide-carbon composite.

2. The method of making a metal oxide-carbon composite of claim 1 wherein said step of providing a carbon aerogel comprises providing an activated carbon aerogel.

3. The method of making a metal oxide-carbon composite of claim 1 wherein said step of providing a carbon aerogel comprises providing a carbon aerogel with carbon nanotubes that make said carbon aerogel mechanically robust.

4. The method of making a metal oxide-carbon composite of claim 1 wherein said step of immersing said carbon aerogel in a metal oxide sol under a vacuum comprises immersing said carbon aerogel in titanium dioxide.

5. The method of making a metal oxide-carbon composite of claim 1 wherein said step of immersing said carbon aerogel in a metal oxide sol under a vacuum comprises immersing said carbon aerogel in a metal oxide sol made from at least one metal salt selected from Mn, Fe, Co, Ni, Cu, Zn, and Zr salts, in combination with propylene oxide, and sol-gel forming components.

6. The method of making a metal oxide-carbon composite of claim 1 wherein said step of immersing said carbon aerogel in a metal oxide sol under a vacuum comprises immersing said carbon aerogel in a metal oxide sol for metal species selected from at least one of manganese, iron, cobalt, nickel, copper, zinc, zirconium, tin, aluminum and chromium.

7. A method of making a metal oxide-carbon composite, comprising the steps of:
    providing an aqueous media or other media to form a suspension,
    adding reactants and catalyst to said suspension to create a reaction mixture,
    curing said reaction mixture to form a wet gel,
    drying said wet gel to produce a dry gel,
    pyrolyzing said dry gel to produce an aerogel,
    immersing said aerogel in a metal oxide sol under a vacuum,
    returning said aerogel and said metal oxide sol to atmospheric pressure,
    curing said aerogel with said metal oxide sol to produce a metal oxide-carbon wet gel composite, and
    drying said metal oxide-carbon wet gel composite to produce a metal oxide-carbon composite.

8. The method of claim 1, further comprising subjecting the metal oxide-carbon composite to carbothermal reduction under nitrogen.

9. The method of claim 8, wherein the carbon aerogel is an activated carbon aerogel.

10. The method of claim 8, wherein the carbon aerogel is a carbon nanotube-supported carbon aerogel.

11. A metal carbonitride-carbon composite obtained by the method of claim 8.

12. The metal carbonitride-carbon composite of claim 11, wherein the metal carbonitride is titanium carbonitride.

13. The metal carbonitride-carbon composite of claim 11, wherein the metal carbonitride is $TiC_{1-x}N_x(0<x<1)$.

14. The method of claim 1, further comprising subjecting the metal oxide-carbon composite to carbothermal reduction under argon.

15. The method of claim 14, wherein the carbon aerogel is an activated carbon aerogel.

16. The method of claim 14, wherein the carbon aerogel is a carbon nanotube-supported carbon aerogel.

17. A metal carbide-carbon composite obtained by the method of claim 14.

18. A metal oxide-carbon composite obtained by the method of claim 1.

19. The metal oxide-carbon composite of claim 18, wherein the metal oxide is titanium dioxide.

* * * * *